United States Patent
Pye

(10) Patent No.: US 10,435,638 B2
(45) Date of Patent: *Oct. 8, 2019

(54) PYROLYSIS PROCESSING OF SOLID WASTE FROM A WATER TREATMENT PLANT

(71) Applicant: C6 TECHNOLOGIES INC., Greenwich, CT (US)

(72) Inventor: David Pye, Meadville, PA (US)

(73) Assignee: C6 Technologies, Inc., Greenwich, CT (US)

( * ) Notice: Subject to any disclaimer, the term of this patent is extended or adjusted under 35 U.S.C. 154(b) by 268 days.

This patent is subject to a terminal disclaimer.

(21) Appl. No.: 15/200,223

(22) Filed: Jul. 1, 2016

(65) Prior Publication Data
US 2017/0058219 A1  Mar. 2, 2017

Related U.S. Application Data

(60) Continuation of application No. 14/037,297, filed on Sep. 25, 2013, now Pat. No. 9,410,094, which is a division of application No. 12/816,632, filed on Jun. 16, 2010, now Pat. No. 8,562,699.

(51) Int. Cl.
| | | |
|---|---|---|
| *C10J 3/60* | (2006.01) | |
| *B09B 3/00* | (2006.01) | |
| *C10B 47/20* | (2006.01) | |
| *C10J 3/72* | (2006.01) | |
| *C10B 53/02* | (2006.01) | |
| *C10B 53/00* | (2006.01) | |
| *F02B 43/08* | (2006.01) | |

(52) U.S. Cl.
CPC ............ *C10J 3/60* (2013.01); *B09B 3/00* (2013.01); *B09B 3/0091* (2013.01); *C10B 47/20* (2013.01); *C10B 53/00* (2013.01); *C10B 53/02* (2013.01); *C10J 3/721* (2013.01); *C10J 2300/0946* (2013.01); *C10J 2300/0973* (2013.01); *C10J 2300/0976* (2013.01); *C10J 2300/1246* (2013.01); *F02B 43/08* (2013.01); *Y02E 50/14* (2013.01)

(58) Field of Classification Search
CPC ....... C10J 2300/0976; C10J 2300/1269; B09B 3/0091
See application file for complete search history.

(56) References Cited

U.S. PATENT DOCUMENTS

| | | |
|---|---|---|
| 4,057,396 A | 11/1977 | Matovich |
| 4,141,694 A | 2/1979 | Camacho |
| 4,217,132 A | 8/1980 | Burge et al. |
| 4,342,830 A | 8/1982 | Holloway |
| 4,540,495 A | 9/1985 | Holloway |
| 4,781,796 A | 11/1988 | Bridle et al. |
| 5,292,442 A | 3/1994 | Khan et al. |
| 5,616,154 A | 4/1997 | Elliott et al. |
| 6,306,248 B1 | 10/2001 | Eley |
| 7,642,394 B1 | 1/2010 | Carle et al. |

(Continued)

*Primary Examiner* — Imran Akram
(74) *Attorney, Agent, or Firm* — Joseph P. Kincart; Rogers Towers, P.A.

(57) ABSTRACT

The present invention provides methods and apparatus for treating waste, such as municipal waste via pyrolysis and yielding one or more of heat energy; electrical energy and fuel. In some embodiments, waste feed stock can be municipal waste in black bag form. In some the present invention additionally provides for processing of hundreds of tons of municipal waste each day.

14 Claims, 9 Drawing Sheets

(56) References Cited

U.S. PATENT DOCUMENTS

2002/0095866 A1    7/2002   Hassett
2007/0204512 A1    9/2007   Self et al.
2008/0061173 A1    3/2008   Michalek et al.
2008/0286192 A1   11/2008   Hamby et al.
2009/0077891 A1    3/2009   Duca et al.

PYROLYSIS PROCESSING OF SOLID WASTE FROM A WATER TREATMENT PLANT

FIELD OF THE INVENTION

The present invention relates to methods and apparatus for converting one or both of mixed waste and biomass into electrical energy. More specifically, the present invention presents methods an apparatus for processing waste, such as for example municipal solid waste and biomass, in a pyrolysis chamber that will create a synthetic gas that can be used to generate electrical power with the use of an electrical generator.

BACKGROUND OF THE INVENTION

Traditional methods of dealing with municipal solid waste generally included one of two alternatives: a) is the waste was burned; or b) the waste was buried. However, landfills and incineration are no longer preferred or even viable solutions due to diminishing area available, environmental concerns and cost to develop/maintain. A landfill capable of servicing a mid size municipality may run into the hundreds of millions of dollars and an approval process may take ten or fifteen years. Once in operation, the full life of a landfill may be shortened due to environmental concern.

Incineration of waste creates greenhouse gases which are being targeted to be reduced, thus processes that produce them are being considered to be unacceptable. In the United States, the number of operating landfills has diminished significantly over the last several decades. Consequently, alternative ways of dealing with municipal waste must be sought.

It is known for biomass to be treated with Pyrolysis or similar heating methods that limit an amount of oxygen available to the waste and thereby eliminate combustion, such as, for example the system described in U.S. Pat. No. 7,293,511. In some known processes an oil, is generated which may be burned in a relatively clean fashion. Conditions for producing pyrolysis oil will typically include virtually no oxygen. Pyrolysis oil or other thermo-chemically-derived biomass liquids can be used directly as fuel, or sometimes as a platform to produce chemicals and materials.

Currently known Pyrolysis machines include a heat chamber and a heat source located around the periphery of the heating chamber. Although these units provide a proof of concept to a basic science of conversion of biomass to a usable product, their effectiveness has only been applicable for relatively homogeneous biomass, such as by products of a paper mill, and only for modest amounts of biomass conversion. In addition, the efficiency of these known type of pyrolysis units is generally less than desirable.

Fast pyrolysis includes thermal decomposition of a biomass fuel at moderate temperatures with a relatively high heat transfer rate to the biomass particles and a short hot vapor residence time in a reaction zone. Several reactor configurations have been shown to assure such conditions and to achieve yields of byproducts a burnable liquid byproduct. Designs of such pyrolysis apparatus may include bubbling fluid beds, circulating and transported beds, cyclonic reactors, and ablative reactors.

Biomass pyrolysis research has been directed to vortex (cyclonic) and fluidized bed reactors for processing biomass via pyrolysis. The fluidized bed reactor of the Thermochemical Users Facility at the National Renewable Energy Laboratory is a 1.8 m high cylindrical vessel of 20 cm diameter in the lower (fluidization) zone, expanded to 36 cm diameter in the freeboard section. It is equipped in a perforated gas distribution plate and an internal cyclone to retain entrained bed media (typically sand). The reactor is heated electrically and can operate at temperatures up to 700° C. at a throughput of 15-20 kg/h of biomass.

Some experimental pyrolysis technologies have been demonstrated which utilize circulating fluidized bed plants. However, each of the fluidized bed plant models requires homogeneous biomass and can only scale to a size too small to function effectively for a municipality. Generally, the previously known pyrolysis machines expose biomass to 550° C., in an oxygen-deprived environment and do not provide an adequate amount of heat transfer area for a uniform amount of heat to consistently treat municipal waste.

Accordingly, new apparatus and methods are needed to efficiently treating municipal waste on a scale suitable for a small city or waste processing area.

SUMMARY OF THE INVENTION

Accordingly, the present invention provides the methods and apparatus for providing a pyrolysis waste treatment to clean energy system in relatively environmentally friendly manner. In preferred embodiments, the "waste" includes mixed municipal waste, although other forms of waste, such as, for example, one or more of solid waste from a water treatment plant, homogenous waste, and biomass may also be utilized.

In some embodiments of the present invention, apparatus and methods are provided which are capable of converting fifteen hundred (1,500) tons or more of municipal solid waste into about seven hundred eighty seven (787) megawatts of electricity per day. Generally, to place this in perspective, 787 megawatts per day is enough electricity to power approximately thirty thousand (30,000) homes each day.

In one aspect the present invention provides a pyrolysis unit with increased efficiency. The pyrolysis unit specifically includes a muffle and a heat source. In preferred embodiments, the heat source includes a combustion chamber, capable of burning gas resulting from the exposing municipal waste to pyrolysis. Other heat sources may include, for example, electrical heaters. According to the present invention, the muffle and heat tube configuration increases the heated surface area which the waste is exposed. The increased exposure of heat throughout the muffle provides for more uniform and complete pyrolysis of the waste material feed stock placed into the muffle while also deceasing the amount of retention time that the waste material feed stock must be within the muffle in order to be adequately processed.

In another aspect, multiple pyroliser retorts may be joined together to form a single pyrolysis unit for processing one or more of: municipal and commercial and industrial waste.

BRIEF DESCRIPTION OF THE DRAWINGS

As presented herein, various embodiments of the present invention will be described, followed by some specific examples of various components that can be utilized to implement the embodiments. The following drawings facilitate the description of some embodiments.

DETAILED DESCRIPTION

Figure 1:
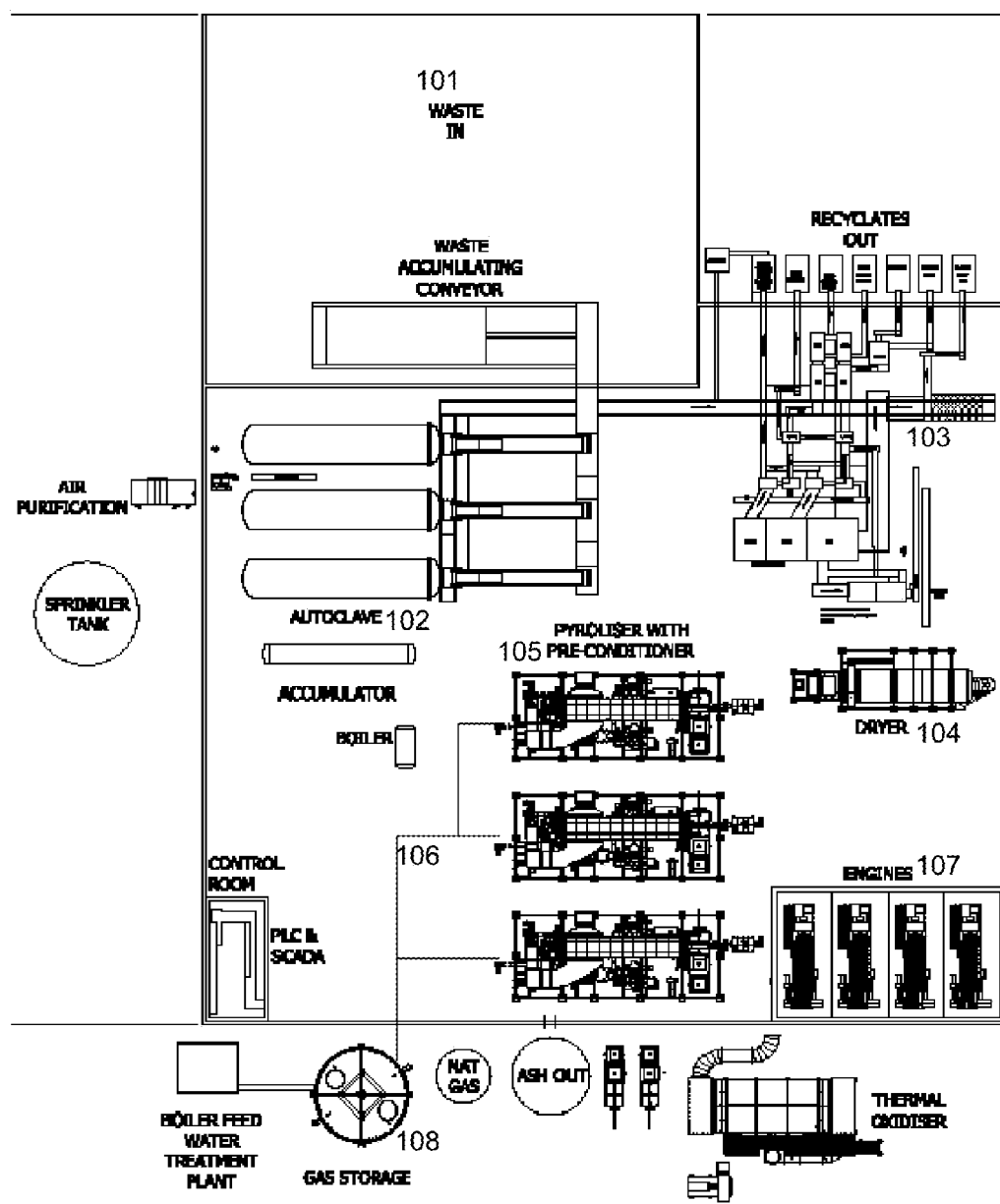
FIG. 1 illustrates a pyrolysis unit within a waste processing facility according to some embodiments of the present invention.

The present invention provides methods and apparatus for converting municipal solid waste into electrical energy on a scale commensurate with urban and suburban needs. Generally, the methods and apparatus described herein eliminate the need for the manual presorting of garbage and can accommodate one thousand or more tons a day of unprocessed "black-bag" garbage or construction debris. The present invention provides for the production of high calorific value fuel, which can be used in gas run turbines to produce electricity. The fuel can also be used in Cogeneration/Combined Heat and Power (CHP) technology to produce not only electricity but also other useful heat; production of hydrogen, which many be seen as an increasingly valuable resource. The present invention is scalable such that although size, quantities and volumes are generally described to process approximately fifteen hundred tons of municipal waste per day, such sizes, quantities and volumes may be scaled or duplicated to provide greater or smaller volumes of processing.

The methods and apparatus presented herein generally relate to thermal processing of municipal waste in an oxygen deprived environment which stifles combustion during the thermal processing. A pyrolysis gas or liquid fuel byproduct is produced which may be used to power turbines, or other power generating equipment, and generate heat used in the process and also provide electrical energy to a power grid connected to a plant operating according to the concepts provided herein.

Waste is input into pyrolysis chambers and exposed to a "cooking process" or "pyrolyzised". In the pyrolysis chambers, the waste is exposed to high temperatures of between 500° C. and 800° C. in an atmosphere of reduced oxygen such that combustion is contained. Following processing of the compacted waste within the pressure vessels a series of conveyors, screens and separators utilizing various material separation techniques may be provided to enable recovery of metals, plastics and glass and other materials. Systems for loading, processing, offloading and material separation may be controlled by a programmable logic controller (PLC) and is supported by a fully integrated automation system.

Definitions

As used herein, MSW refers to municipal solid waste also called urban solid waste, means one or more of household (domestic waste), commercial and institutional waste materials. a MSW may be in one or both of solid and semisolid form and generally exclude industrial hazardous wastes.

As used herein, REC refers to renewable energy center such as, for example a location where researchers and businesses interested in advancing, developing, and using alternative energy technologies and related applications.

As used herein, I&C waste refers to industrial and commercial waste which is a general reference to a different kind of dry waste, such as office waste, product packaging waste, production waste and the like.

As used herein, dryer refers to an appliance or piece of equipment that removes moisture by heating or another process As used herein, muffle refers to a single unit with baffles.

As used herein, a retort is an enclosed piece of equipment that will collect the omitted gases from the process.

As used herein, RDF is Refuse derived fuel RDF is produced by processing MSW to increase the fuel value of the waste. The processing removes incombustible materials such as dirt, glass, metals, and very wet organics, and it makes RDF more consistent in size than raw MSW. RDF can be burned for fuel by itself or co-fired with other fuels.

As used herein, bag filter recovers particulate matter from exhaust gas to recover product and reduce air emissions or violate air pollution standards. The bag filter includes housing, filter bags, cleaning and air bleed assembly.

As used herein, gasometer is a large container where gas is stored for system use.

Referring now to FIG. 1, MSW, I & C waste or other feedstock 101 is fed into a pre-conditioner, such as, for example an autoclave 102. The pre-conditioner may be used to preheat biomass. Partial volatilization may be carried out within the pre-conditioner. The pre-conditioner may include, for example, an indirectly heated, rotary drum type pre-pyrolysis unit.

MSW or I&C may enter the pre-pyrolysis unit in black garbage bags or other raw form and exit the pre-pyrolysis unit in a form resembling the texture and appearance of potting soil. The pre-pyrolysis unit may be operated at temperature suitable to a particular waste feedstock. For MSW a suitable temperature is generally at a nominal temperature of about 500° C., however, generally temperatures of between 400° C. and 600° C. may be used.

In some embodiments, an ingress of air into the unit is prevented or limited. Limited air decreased the opportunity for combustion, in some embodiments, a maintenance of a high organic waste bed level in the feed hopper, this design is a driven screw feeder the compression of the waste within screw feeder the nitrogen bleed to the screw. The screw feeder may be interlocked to prevent the feed level contained in the hopper falling below a pre-determined level. An exit of the drum may be located, for example, directly above the pyrolysis where the exiting material falls directly into the dry pyrolysis.

One or both of exiting MSW and I&C pre-conditioned material is transported, such s, for example via a conveyor or other automated carrying device to a sifting section, such as a mechanical screening device with a sifting screen. The sifting screen separates out the organic cellulosic grains or flakes from the larger inorganic matter, such as, aluminum, magnetic metals and plastics. Heavier aluminum and magnetic metals may be separated for recycling. Lighter weight plastics can be shredded or ground into a size and shape suitable as feedstock for the pyrolysis unit.

One or more of preheated and partially carbonized feed and fiber 103 and the volatiles created in the pre-pyrolysis are fed to a dryer 104 where they are dried and discharged into the top of the pyrolysis muffle. Pyrolysis 105 occurs within a pyrolysis unit fed by the pyrolysis muffle.

During its passage under gravity to the base of the pyrolysis near complete carbonization of the fiber occurs, releasing additional volatile gases present in the feed. Multiple radiant tubes are contained within the retort. This provides increased retention time of the product in the heated muffle and importantly increases and more uniformly allow radiant heat exposure to the product to pyrolise.

Conventional plate systems rely on the walls to provide the heat source directly to the material adjacent to the walls leaving the material not in direct contact not at the same temperature whereas the present invention provides for radiation heat throughout the muffle uniformly heating product to maximize efficiency and product yield. The synthetic gas produced from this heating process is discharged from the muffle via ports located along its length to be collected into a common, external manifold (106). To maintain a constant temperature profile, the furnace annulus external to the muffle is divided into a number of control zones of automatic temperature control. To ensure atmosphere integrity within the muffle, it may be operated at a slight positive pressure and the exit screw may incorporate a nitrogen bleed In some embodiments, an additional muffle that may be located within the exhaust stack from the pyrolysis. This heating opportunity is to complete any partially oxidated tar-carbon impregnated ash exiting both the pyrolysis and the expansion chamber to produce mainly oxides of carbon and hydrogen. Heat source for this muffle is steam via live injection.

Hot tar and particle laden synthetic gas is discharged from an external manifold into the top of an expansion chamber, where the design will cause a dramatic reduction in gas velocity. The gas's ability to carry tar laden particulate in suspension will be significantly reduced when precipitation of the latter onto an internal surface of the unit occurs. The unit incorporates, externally located, and pneumatically operated hammers to minimize particulate buildup on the walls. The base of the unit serves as a temporary depository for tar impregnated particulate ash matter that is deposited in the adjacent coolers. A screw conveyor, located in the base of the unit, then removes the accumulated material and delivers it to the top of the exhaust stack muffle for further oxidation.

Synthetic gas is discharged from the expansion chamber, via isolation valves, into one of two cooling chambers, each of which is able to handle the entire gas flow independently. Both chambers incorporate water cooled panels and a screw conveyor to transfer one or both of the condensed sludge and ash produced back to the expansion chamber for further processing.

Cooled synthetic gas may be ducted to the base of one or more scrubber units, each of which may handle an entire flow of gas. To exit from the top of the scrubber, at least some of the gas passes through a bed of cages contra-flow to a water spray. During its passage through the bed, both further cooling and scrubbing of the gas resulting in the removal of both soluble and insoluble tars. In some embodiments, at least a portion of the insoluble tars deposit on the ceramic balls, reducing the porosity of the bed, one or more tar cleansing system to regenerate the bed of either unit is included within the supply.

A gas booster, complete with an automatically controlled circulation loop, to ensure gas delivery to downstream users at a consistent positive pressure, sucks "Clean to use" gas from the scrubbers. To handle intermittent changes in gas consumption, preferred embodiments include a gas holding tank 108 included to act as a buffer.

Clean to use gas may then be routed for one or more of: consumption in gas powered turbine engines 107, powering of generators as a source of energy; and steam generation to be used within a waste processing facility. Solid waste is generally sterile and environmentally neutral.

Figure 2A:
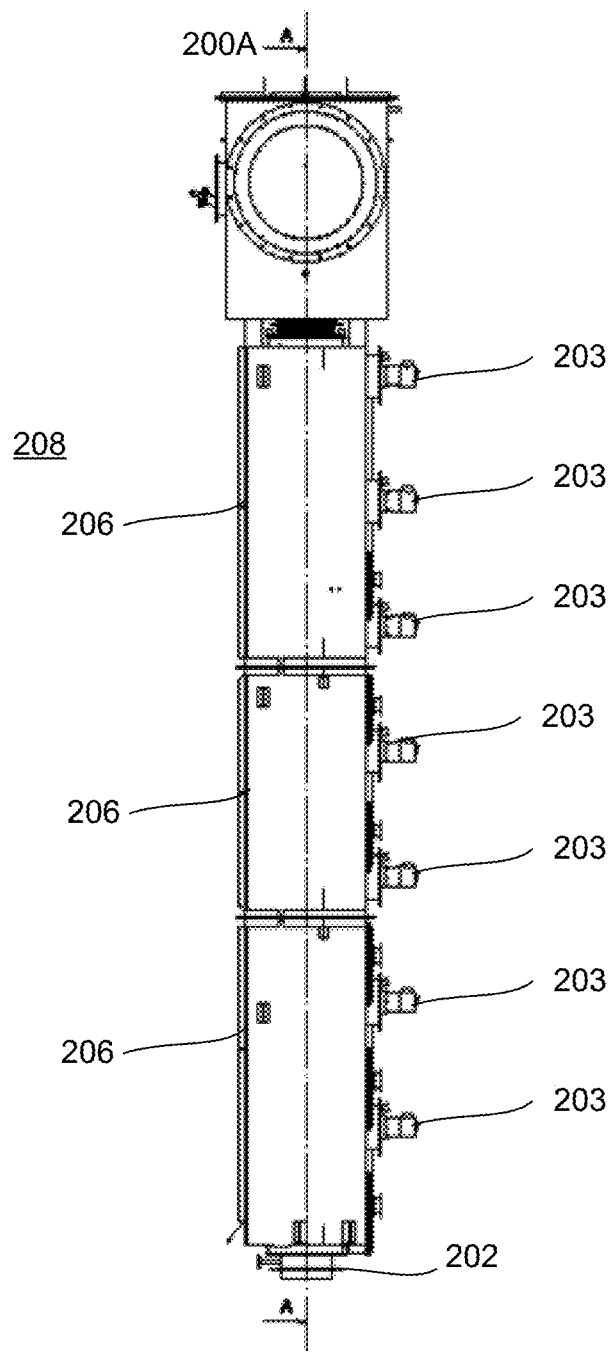
FIGS. 2A, 2B, 2C, 2D, 2E, 2F and 2G illustrate various views of a pyrolysis unit.

Referring now to FIG. 2A, a pyroliser retort 200A is illustrated along with individual controls zones 206 that can provide more efficient operation of a pyrolysis muffle 208. One or more combustion chambers 203 provide thermal energy to the pyrolysis muffle 208. Also shown is residue exit passage 202

Figure 2B:
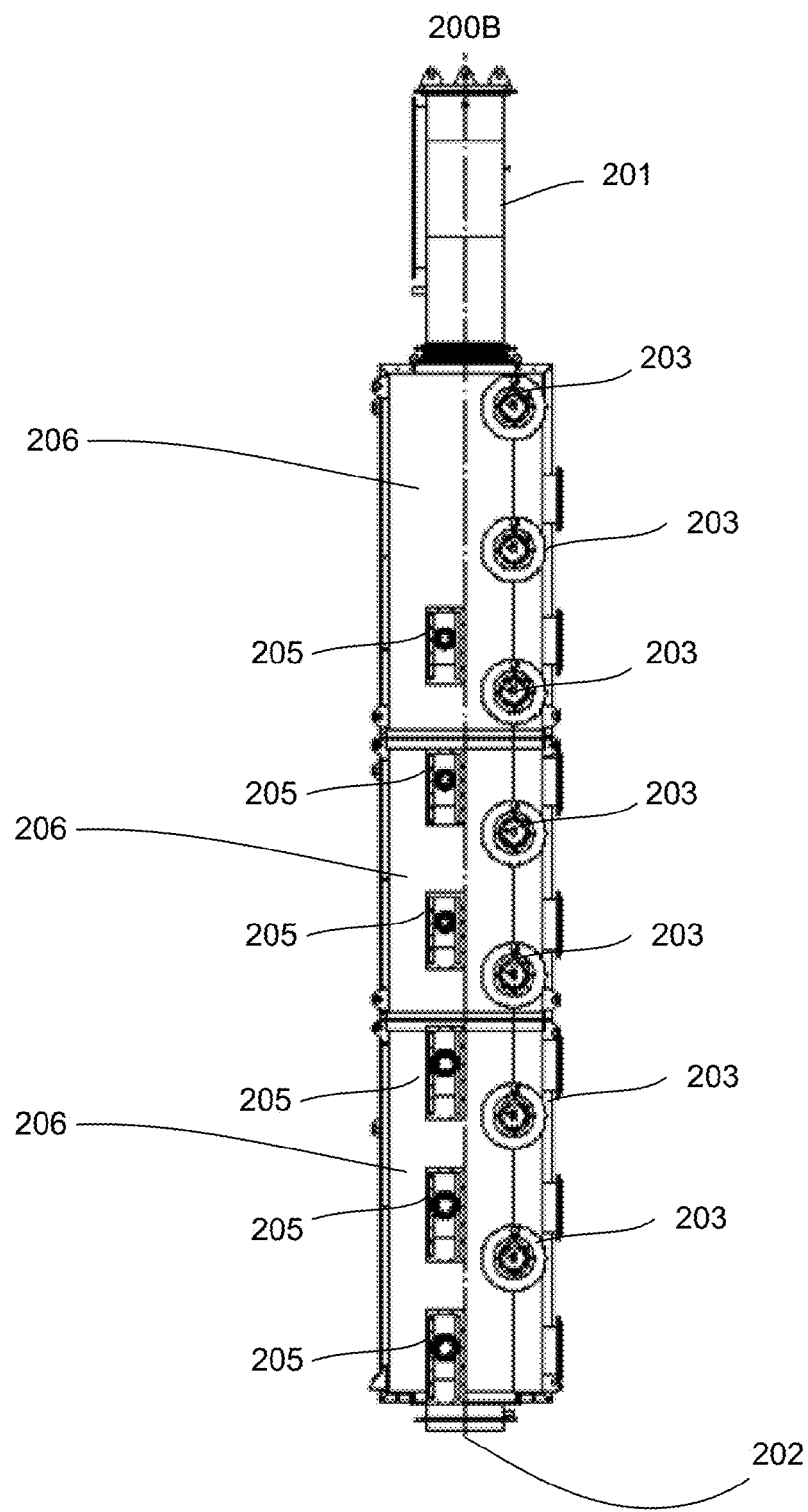

Referring now to FIG. 2B, multiple retorts 200B may be stacked or otherwise aligned to a form a pyrolysis muffle 208. The muffle 208 will include an in feed ingress passage 201 and residue exit passage 202. Generally, as described herein, the in feed ingress passage 201 will receive preheated and pre-processed waste material and the residue exit passage 202 will pass out carbonized waste. One or more gas take offs 205 may be functional to remove gas resulting from the pyrolysis treatment of the waste. Individual control zones 206 may provide more efficient operation of the pyrolysis muffle 208.

Figure 2C:
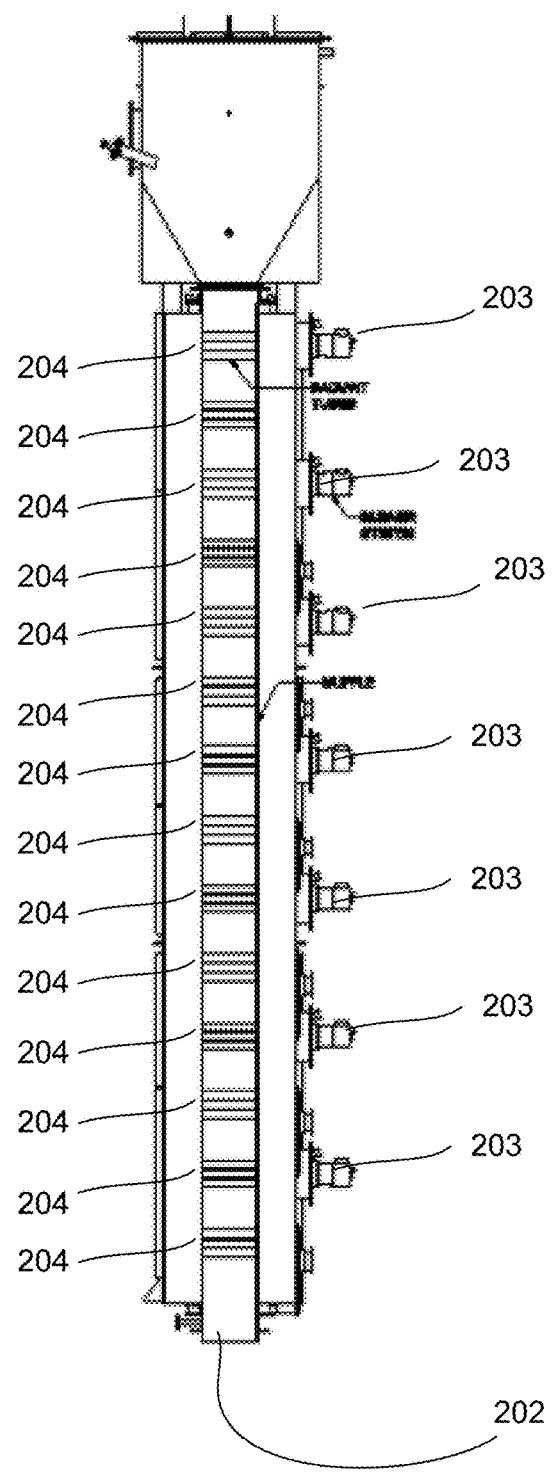

Referring now to FIG. 2C, heating tubes 204 are included to better distribute heat throughout the muffle 208 and more efficiently process waste placed within the muffle.

Figure 2D:
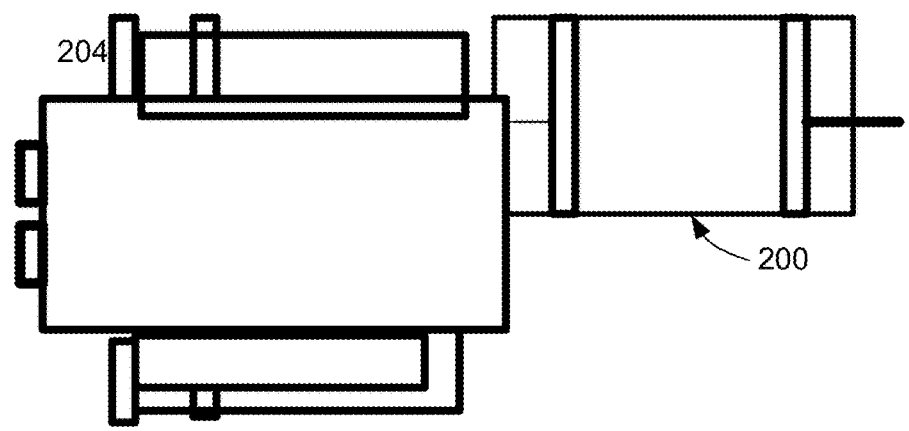
Figure 2E:
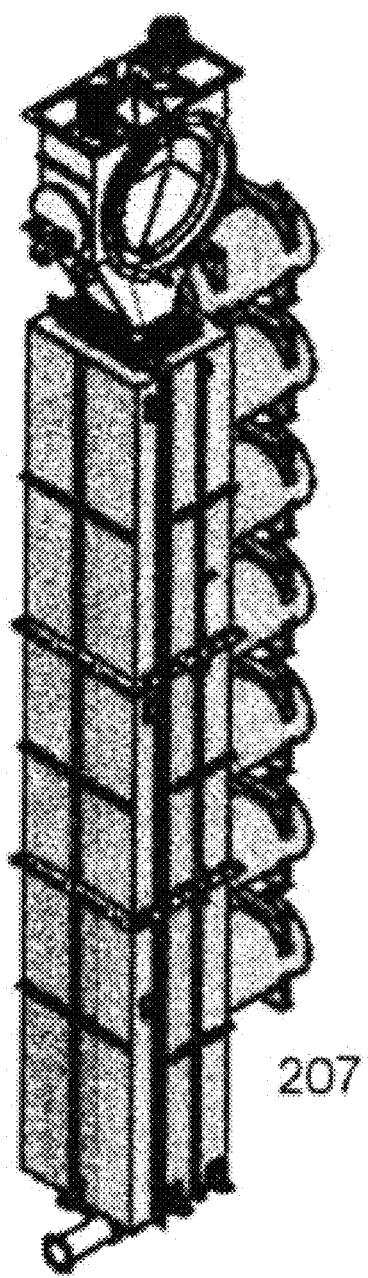

Referring now to FIG. 2D, according to the present invention a pyroliser retort may include heating or radiation tubes 204. The heating tubes 203 provide more uniform and efficient heat distribution within the retort 200, as compared to a retort without such radiation tubes 204.

Figure 2F:
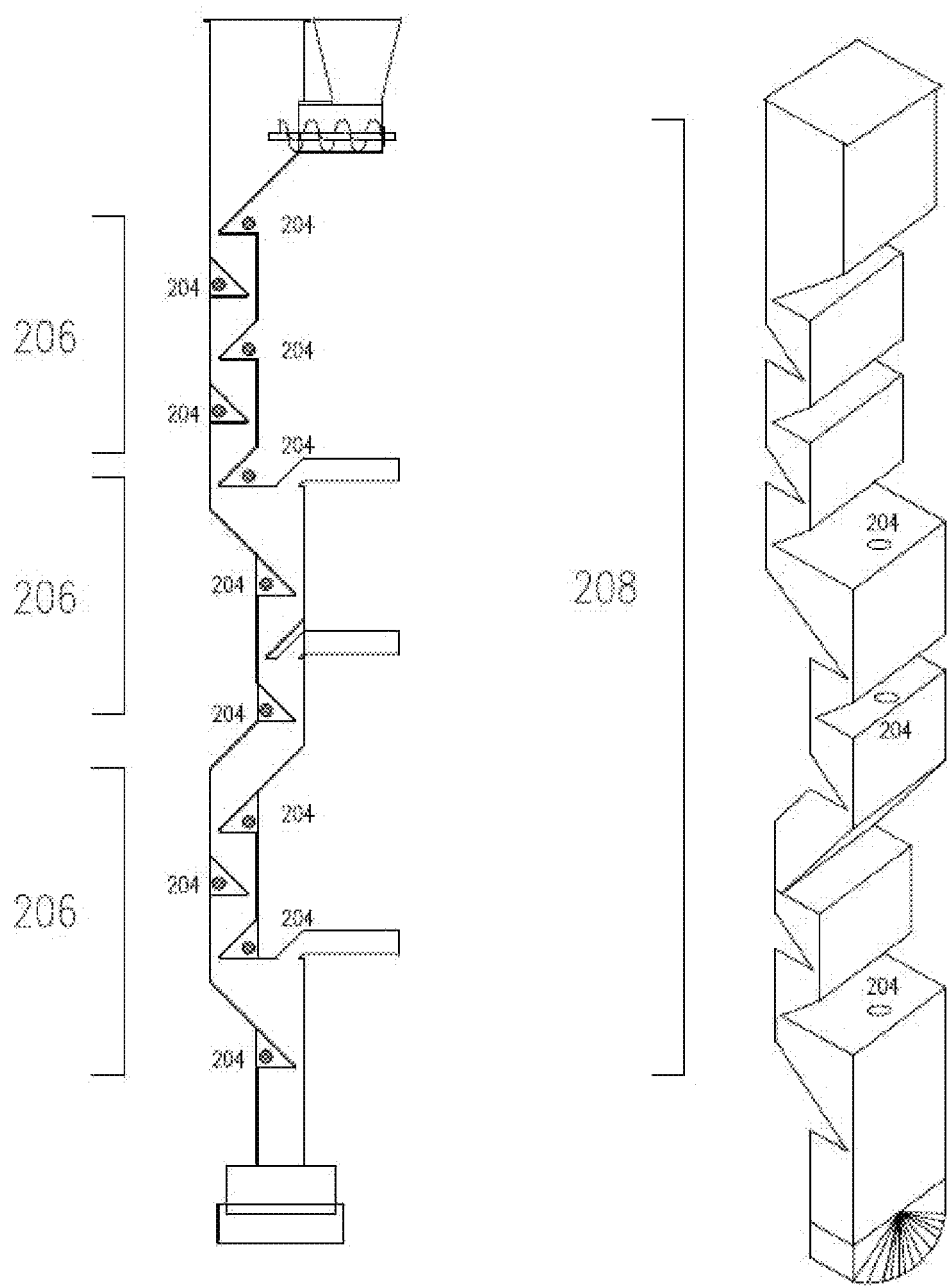
Figure 2G:
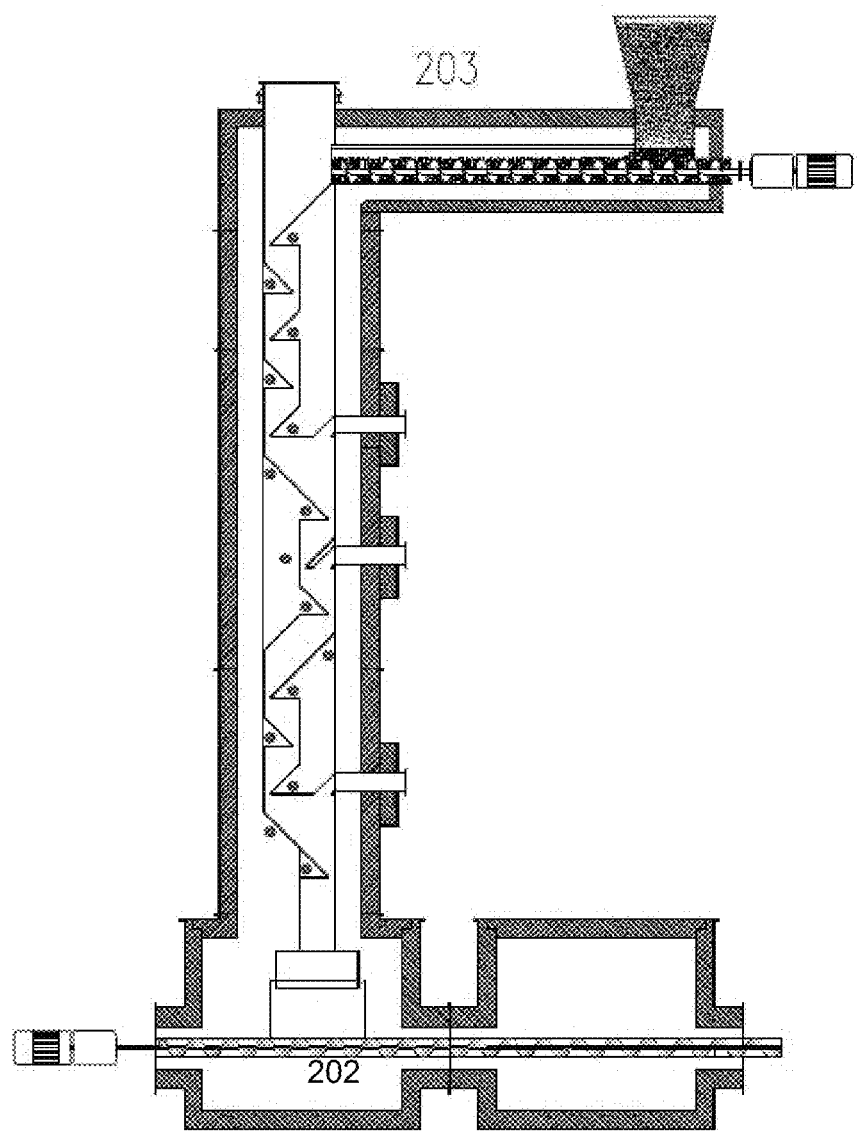

Referring now to FIG. 2F, a perspective view of a pyrolysis unit according to the present invention is also illustrated at 207.

Figure 3:
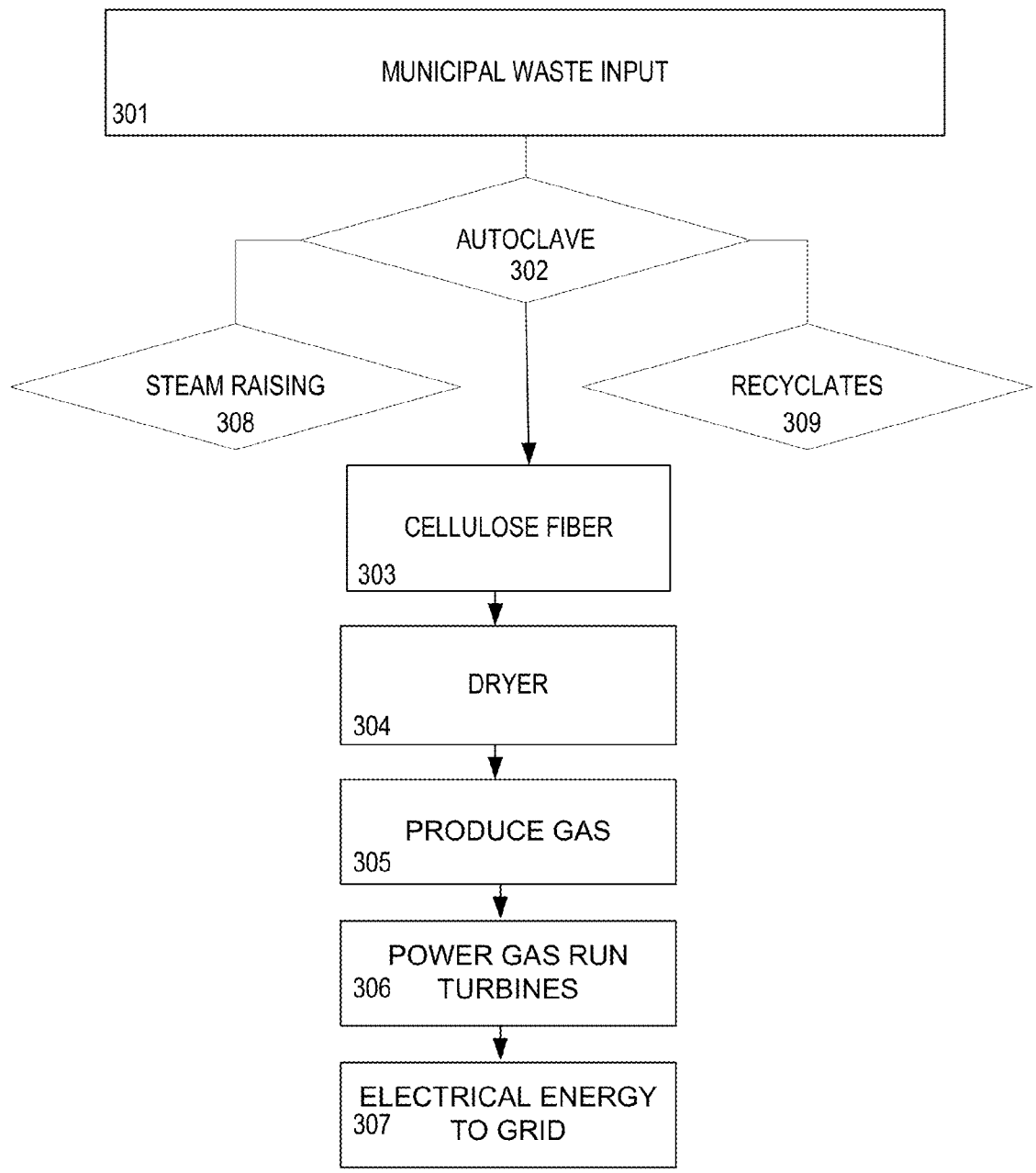
FIG. 3 illustrates an exemplary method to process municipal waste input.

Referring to FIG. 3, an exemplary facility layout is illustrated.

In some embodiments, input feedstock may include mixed municipal waste, sometimes referred to as "black bag" municipal waste due its collection in black garbage bags. The input feedstock may be delivered to the waste site by way of container; straight beam truck, barge transport or other known means of waste transport. The transported waste is preferably loaded onto a feed system for conveyance to other portions of the apparatus.

In some embodiments, the feed system may load input mixed waste sequentially into a pressure vessel to compact the mixed waste material that is to be processed. Generally, the system efficiency increases as compaction of feed increases.

Compacted waste is input into pyrolysis chambers and exposed to pyrolysis. In the pyrolysis chambers, the waste is exposed to high temperatures of between 500° C. and 800° C. in an atmosphere of reduced oxygen such that combustion is contained. Following processing of the compacted waste within the pressure vessels a series of conveyors, screens and separators utilizing various material separation techniques may be provided to enable recovery of metals, plastics and glass and other materials.

In some embodiments multiple autoclaves, such as for example six autoclaves can be used to sterilize the waste used as feed into the renewable energy generation systems of the present invention. Each autoclave may include a pressure vessel that contains an internal rotary drum which may extend past the autoclave entrance flange to eliminate contamination for sealing purposes. In some embodiments, the internal drum may be supported on wheels positioned within the pressure vessel initially radial to the autoclave to provide a smooth rotational movement. These wheels may be capable of being positioned at up to about 90 degrees to allow for withdrawal of the inner drum when desired. The inlet door of a standard spherical design can be side hinged.

In some embodiments a drive for the autoclave may be engineered on the basis of a central drive via chain wheel and sprocket around the girth of the inner drum. The pressure vessel may be insulated by way of 100 mm mineral wood providing a heat loss of 100 watts per square meter at maximum temperature. Drum rotation may be accomplished by way of a motor and gearbox assembly mounted external to the autoclave or alternative hydraulic motor.

In some embodiments a steam generator, such as, for example, a dual fuel boiler may be used in conjunction with the autoclave. By way of non-limiting example, a maximum demand on the steam generator can be in the order of 12,000 kg per hour. Generally, duplexing (pressurizing one vessel while de-pressurizing the other) the demand can be decreased. The Autoclave may operate, for example, at a pressure of approximately 5.2 Bar/160 degrees C. The boiler however, may be designed to charge the accumulator to a pressure of 17 bar or more.

In some embodiment, an accumulator may be positioned adjacent to the six autoclaves and provide for a peak demand well in excess of an average steam produced by the steam boiler. Some particular examples may include an accumulator vessel capable of storing pressurized hot water at between 10 and 25 bar and nominally 17 bar. In addition, some particular embodiments can include an accumulator vessel with dimensions of approximately 3.5 m diameter by 13.5 m long.

In some preferred embodiments, shell and tube type condensers are employed and are close coupled to the system to allow any of the condensers to operate with either of the autoclaves. Each condenser is sized to accommodate initial high volume through to the lower volume near to pressure equalization. A programmable control valve within the system ensures that the condenser is not overloaded at the start of the evacuation process. In some embodiments, a water treatment system may also be included to treat water at a flow rate of approximately 20 m$^3$/hr (6 m$^3$ in 20 mins) or more of condensate as it is withdrawn from the condenser. Discharge from the water treatment system may preferably be of boiler feed water quality.

Cooled water from the autoclave (6 m3/20 mins) may enter one or more electro-coagulation units. Each electro-coagulation unit in turn may include one or more ×4 aluminum electrodes and run from a power controller. A single controller or redundant controllers may be utilized. Coagulated effluent may be discharged directly to a flotation unit (5 m3 capacity) where solid-liquid separation occurs or other discharge route.

In some embodiments, contaminants in the waste stream can be removed via a mechanical scraper from the top of an electro-flotation unit and discharged to a sludge tank. Clarified water is available for return to a Return Tank as Boiler Feed water. An ON/OFF control of the electro-coagulation unit is controlled via a signal from the PLC. Pumped feed to the electro-coagulation unit and of final effluent to the return tank is also controlled via the PLC.

Water is condensed from an air scrubber/packed tower. Water from the air scrubber may flow at a rate of about 5 m$^3$/Hr. Chemical oxygen demand of approximately 0-1000 mg/l is used for typical MSW purposes.

Air scrubber water (5 m 3/hr.) enters electro-oxidation units. Each unit includes ×4 platinum equivalent coated electrodes and run from a single 70 A power controller. Oxidized effluent is discharged direct to a flotation unit (1 m3 capacity) where solid-liquid separation may occur. Contaminants in the waste stream are removed by a mechanical scraper from the top of the Electro-flotation unit and discharged to a sludge tank. Treated water is available for recycling.

An oil storage tank with approximate dimensions of 2.5 meters diameter by 3 meters high and a capacity of about 13,500 liters of distillate oil is sized to permit continuous operation of the facility on gas oil, in either mode of operation, for a period of 24 hours before replenishment. The tank is preferably of the above ground level installation type and employ gravity feed to the boiler.

Granular media filters are located at the discharge of all condensers to clarify the condensate stream. The filters are adequately sized to handle a number of condensation cycles and be fitted with a flow monitoring device to initiate automatic cleansing at the end of a cycle. The back flush, which is typically less than 5% of condensate, can be discharged to the sludge tank.

An initial condenser serves the dual role of a boiler feed water pre-heater. It is of shell and tube construction and can be operated, on the tube side, as a single or multiple pass units to suit the operating mode of the autoclave. Preheated feed water can be discharged into the hot feed water reservoir until its maximum level had been achieved. At this juncture, the bypass valve would open and surplus feed-cooling water can be returned to the cold feed water tank.

To accommodate the significantly different cooling loads between the two modes of operation and prevent overloading of the feed water pre-heater—condenser, the timing of the opening speed of the pneumatically operated flow control valves can be adjustable.

To accommodate the significantly different cooling loads between the two modes of operation, the final condenser would permit direct and/or indirect cooling of the exhaust stream. That is, the unit can be of shell and tube form with an additional spray feature. With the autoclaves operating in the cascade mode, only the shell and tube configuration can be employed. When operating in the non cascade mode, only sufficient direct contact cooling water can be used to achieve the additional cooling required.

A mixed bed, such as, for example a cation-anion exchange resin bed, purifies reclaimed condensate and raw municipal make up water to boiler feed water quality. The purified water is fed to the cold feed water reservoir until it has been refilled. The unit then automatically reverts to its regeneration mode. After regeneration with acid and an alkali, the resins may be rinsed and the bed remixed with compressed air.

A hot feed water tank, with a capacity of approximately 6000 liters, is located adjacent to the boiler and receives pre-heated water from the initial condenser. The tank is insulated and includes a vent to atmosphere to permit degassing of the boiler feed water. To both increase the feed water temperature and compensate for heat losses, the tank is connected to the feed water heater. The tank is fitted with a level indicator and high and low level switches.

A feed water heater of tubular construction is located in the exhaust flue from the boiler and connected to the hot feed water tank. Circulation of water through the system is by natural convection.

The cold feed water tank, of approximately 10,000 liters capacity is refilled via a de-ionization plant and provides water to the shell and tube condensers. It is equipped with level switches to control refilling. Upon evacuation of hot vapors from an autoclave, water is pumped from one end of the tank to the condensers. Once the hot feed water tank has been refilled, surplus feed water from the condensers is returned to the other end of the tank. To minimize mixing of the returned warm water with the remaining cold water, the tank is fitted with internal partitions along its length.

Located above the cold water feed tank, may be a set of air blast coolers with a total cooling capacity of approximately 5 GJ/H. Water from the hot end of the cold water feed tank is pumped through the cooling tubes and returned to the cold end of the tank. Each cooler is fitted with a high volume, axial flow fan, which blows oil over the cooling tubes.

Condensate, after passage through the filters is piped to the hot well, which is fitted with high and low level switches. A sump pump discharges water from the well to the raw water holding tank.

A holding tank, with a capacity of about 5000 liters, can be installed adjacent to the deionization plant to provide it with its main source of water. The tank can be fitted with a low level switch to ensure a continuous supply of water to the deionization plant from the municipal supply.

A fine filter can be located upstream of the deionization plant to polish the water quality to that unit. The filter can be of the duplex type and equipment with a differential pressure switch to determine a fouling level.

Although the boiler can be supplied with high purity feed water, over time the total dissolved solids may increase. To monitor this condition the conductivity of the boiler water can be continuously monitored.

In some embodiments the boiler can be equipped with a blow down receiver to permit the venting of hot boiler water for T.D.S. adjustment. Venting would occur subsequent to autoclave pressurization and the vented water, after cooling, can be returned to the raw water tank for recycling through the deionizer.

In some embodiments the steam supply to each autoclave can be via a steam ejector. When the autoclaves were operating in the cascade mode and subsequent to pressure equalization, steam vapor from the processed autoclave can be recycled into the green autoclave during pressurization. This may significantly reduce the cooling load on the condensers and improve overall plant efficiency.

Back flush water from the granular filters is pumped to the sludge tank, which has a capacity of approximately 500 liters, where heavier particles settle out naturally by virtue of gravitation. Coagulation of the finer particles into heavier more dense ones is achieved by electro kinetics. Once the filtrate has clarified it is pumped to the hot well via a granular bed filter. The resulting sludge can either be consigned to the landfill fraction or "black bagged" for recycling through the process.

Prior to pressurization, the pressure in the autoclave is reduced to less than 100 mb absolute pressure by liquid ring vacuum pumps with a total capacity of about 3000 m³/h in less than 15 minutes.

Subsequent to pressurization, the same vacuum system is employed to evacuate the steam and remaining non-condensable gases from the autoclave. Commensurate with the reduction in pressure, condensate absorbed by the waste during pressurization may flash to steam and be extracted by the vacuum pumps. Hence with the re-attainment of the 100 mb a pressure, the average temperature of the waste is slightly above ambient and the moisture content slightly in excess of that of the green waste.

To achieve an optimum in energy utilization, an economizer is located in the exhaust flue down steam of the feed water heater to preheat the boiler burner combustion air. After the vacuum depletion and upon the opening of the autoclave door, the autoclave can be reconnected to the vacuum system to ensure that an air flow into the autoclave from ambient is maintained during unloading to avoid the release of a plume.

A continuous flow of water can be employed to maintain the liquid ring which can be discharged, along with the non condensables, into a separator. The water can be fed from the separator to the hot well whereas the non condensables can be ducted to the odor control device.

To remove undesirable odors from the non condensable gas steam prior to discharge to atmosphere, the gases can be passed through an absorption tower. Whilst current thinking is to employ a packed tower, employing carbon Raschig rings, with a counter-flow water sprays, PTE may be not totally convinced that this represents the optimum solution. PTE, therefore propose the packed tower approach provisionally and may continue research on this aspect such that after consultation a final decision on the most efficient solution can be made.

Free standing, un-insulated steel stacks can vent boiler flue gases and de-odorized autoclave exhaust gases to atmosphere. Generally, the stacks are designed to suit local atmospheric conditions and municipal by-laws. (WID compliance)

Pneumatically operated flow control and shut off valves of the butterfly and ball type can be provided where appropriate to fully automate the installation. All automated shut off valves can be provided with manual valve bypasses. Butterfly valves, used on vacuum or steam lines would employ elastomer seals to ensure gas tight closure.

Valves in vacuum and high pressures lines provide to allow an autoclave to be isolated from the system for maintenance purposes is of the lockable closed type.

All piping for fluids at pressures in excess of 10 kPa is preferably seamless to the appropriate pressure classification and fluid color coded to International Standards. Piping in excess of 2" NB is flanged.

With the exception of the boiler/accumulator feed water pumps, all pumps is of the direct connected, centrifugal type with mechanical seals. The boiler feed water pumps include positive displacement piston pumps.

Totalizing meters, with manual bypasses can be located in both the oil and LPG (liquefied petroleum gas) supply manifold to the boiler. Pressure gauges and temperature gauges, mounted in thermowells, monitor gas and oil pressure to the burner, boiler water temperature and pressure combustion air pressure and flue gas exhaust temperature. A level gauge would indicate water level in the boiler shell.

Both autoclaves and the accumulator are fitted with pressure and temperature transmitters to permit monitoring and control of the process via the PLC/Scada. In addition, the accumulator is fitted with high and low level switches to control water level.

Fiber to Energy

The fiber produced is transferred, for example, by way of standard traversing conveyor to the input silo of the 2 dryers. The PLC controlled metering system may alternatively progress the RDF fiber into the dryers at a pre-determined rate. A special designed thermal combustion chamber is positioned in front of the dryer.

Hot gases from the engines are progressed through to this chamber and may provide the primary energy input for the system.

Following exit from the dryer the RDF is progressed through to the pre-pyrolizer systems from where the material is progressed through the pyrolizer in order to produce the gas. The resultant gas may be used to drive gas engines or any other combustion system.

Two standard thermal rotating drum dryers is employed, each designed to take 60% of the throughput capacity. From examination of the dryer P & I.D. it may be seen that the system is based on the use of two concentric drums, each with internal flights thus providing for material charge and discharge at the same end.

Each sealed charge/discharge cuff with a negative pressure seal may ensure material containment. The drive may be accomplished by way of chain driven girth gear, connected to a bed motor system. A variable speed drive is connected with a PLC/Scada System. The dryer receiving silo and charge chute is formed as an integral part of the charge cuff, thus resulting in only one seal for the rotating drum.

A refractory lined heat input chamber is positioned in front of each dryer. The main heat input is drawn through by the ID (induced draft) fan from the collection manifold of the engine exhausts. Supplementary heat input to provide for precise control at the dryer exit is by way of a dual fuel burner designed to operate on the client's selected gas and the exhaust gas produced by the pyrolysis units. Off cyclones, bag filter, complete with pulsing system and exhaust gas, ID fan may form part of the dryer package.

In order to accommodate approximately 21 tons per hour, or more of dry fiber (23.3 tons at 10% moisture) multiple units, such as, for example, a battery of seven units may be installed. Each unit can be complete with six zone vertical tower pyrolysis units and 2, pyrolysis unit systems.

Each zone has its own dual fuel combustion system, suitable for operating on the client's LPG (liquefied petroleum gas) or natural gas or synthetic fuel produced by the system.

Each unit may have its own dedicated gas booster and scrubber from which the gas is progressed, through to a ring main system.

The ash handling system from each pyrolization tower is progressed to a control ash screw, which may progress through to two main plant discharge screws to provide for alternate discharge into road container.

Platforms and support structure manufactured from rolled steel sections may provide support and access to individual items of equipment.

Each of the pyrolysis units can be connected through to a gasometer which may accommodate varying gas volume, thus providing for maximum use of the gas, on a priority basis to the steam boilers, pyrolysis units, dryers and thence to the gas engines on a progressive basis to engines 1 to 7.

Off thermal oxidizers are connected through to a single exhaust stack to provide for a single emission point.

Conclusion

A number of embodiments of the present invention have been described. Nevertheless, it will be understood that various modifications may be made to the process surrounding the pre-conditioning and pyrolysis unit without departing from the spirit and scope of the invention. For example, various methods or equipment may be used to implement the process steps described herein or to create a device according to the inventive concepts provided above and further described in the claims. In addition, various integration of components, as well as software and firmware can be implemented. Accordingly, other embodiments are within the scope of the following claims.

What is claimed is:

1. A method of treating solid waste from a water treatment plant, the method comprising:
   conveying said waste from a water treatment plant comprising one or both of inorganic material and organic material into a pre-conditioner unit;
   exposing the waste to an environment of saturated steam;
   heating the environment of saturated steam containing the waste to a temperature of 160° C. or more;
   following the exposing of the waste to an environment of saturated steam, pyrolysizing the waste as a result of heating of the waste in an retort comprising multiple heat radiant tubes providing increased retention time of the waste in the retort and heat distribution within the retort, the retort comprising an environment depleted of oxygen and maintained at about 700° C. or more;
   producing synthetic gaseous by-product via the pyrolysizing of the waste;
   discharging the synthetic gaseous by product via ports from the retort into a manifold;
   heating said waste from the water treatment plant in said pre-conditioner unit to a temperature of between about 400° C. and 600° C. to essentially sterilize at least a majority of said waste from the water treatment plant; and
   following sterilization of the waste from the water treatment plant, separating inorganic materials from the organic materials.

2. The method of claim 1 wherein the organic material comprises one or more of: cellulosic flakes, wood and textiles.

3. The method of claim 1 wherein the inorganic material comprises one or both of aluminum and magnetic metals.

4. The method of claim 1 wherein the step of heating said waste from the water treatment plant in said pre-conditioner unit comprises placing the waste from the water treatment plant in a chamber comprising a temperature of between about 400° C. and 600° C. to generate pretreated municipal waste.

5. The method of claim 1 wherein the step of pyrolysizing the waste from the water treatment plant additionally comprises passing the waste from the water treatment plant through a retort comprising a heated multi-zoned pyrolysis muffle chamber.

6. The method of claim 5 additionally comprising the step of providing heat through radiant tubes within the multi-zoned pyrolysis muffle chamber.

7. The method of claim 6, wherein the heat provided through the radiant tubes promotes pyrolysis of the waste from the water treatment plant.

8. The method of claim 7 additionally comprising the step of generating synthetic gas as a result of the pyrolysis of the waste from the water treatment plant.

9. The method of claim 8 additionally comprising the step of passing the synthetic gas through gas take off ports in gaseous communication with the multi-zoned pyrolysis muffle chamber.

10. The method of claim 9 additionally comprising the step of cooling said synthetic gas in a cooling chamber.

11. The method of claim 10 additionally comprising the step of cooling the cooling chamber via circulation of a coolant in thermal communication with said cooling chamber.

12. The method of claim 11 wherein said coolant comprises an aqueous solution.

13. The method of claim 12, additionally comprising the step of scrubbing the synthetic gas via a gas scrubber.

14. The method of claim 9 additionally comprising the step of conveying condensed tar and oil to a collector, wherein the condensed tar and oil result from placing organic material in the pyrolysis chamber.

* * * * *